2,889,342

3,17α-DIACYLOXY-6-ALKYL-3,5-PREGNADIEN-20-ONES AND DERIVATIVES

Bjarte Löken, Roosevelt, Puerto Rico, assignor to G. D. Searle & Co., Chicago, Ill., a corporation of Delaware No Drawing. Application August 18, 1958
Serial No. 755,445

5 Claims. (Cl. 260—397.4)

This invention relates to 3,17α-diacyloxy-6-alkyl-3,5-pregnadien-20-ones and 3,17α,20-triacyloxy-6-alkyl-3,5,20-pregnatrienes, and to methods for their preparation. The compounds of this invention have a strong progestational activity. They are particularly valuable because the compounds can be orally administered and have a good duration of action.

The compounds of this invention can be represented by the general structural formula

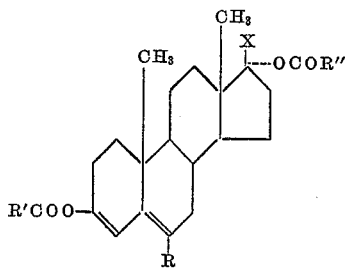

wherein X is —CO—CH₃ or —C(O—CO—R')=CH₂ and wherein R is methyl or ethyl. In the foregoing structural formula R' and R" can represent lower alkyl groups such as methyl, ethyl, straight chain or branched propyl, butyl, amyl or hexyl.

The compounds in which R' and R" are identical are readily prepared by the treatment of 6α-methyl-17α-hydroxyprogesterone with an acyl anhydride of the type (R'₂CO)₂O, in the presence of an acid catalyst. Under mild reaction conditions the principle reaction product is the compound in which X is a —CO—CH₃ group. If the reaction conditions are made more severe the conversion is carried further to yield the triene triacylates.

To carry out the enolization step an acid catalyst is required. A variety of strong acids can be used for this reaction including the alkanesulfonic acids and arylsulfonic acids such as methanesulfonic, ethanesulfonic, benzenesulfonic, and toluenesulfonic acids. It is also possible to use small quantities of strong mineral acids; thus small amounts of sulfuric acid can be usefully employed.

Where it is desired to prepare compounds in which R' is not the same alkyl group as R" it is convenient to submit a 6α-methyl-17α-acyloxyprogesterone to the same enolization reaction.

It is also possible to use as a starting material a 5α,17α-dihydroxy-6β-alkylallopregnane-3,20-dione which, under the reaction conditions used for the enolization, first undergoes a dehydration to the Δ4-derivative; this is then esterified and enolized.

The enolization reaction to the diene derivative proceeds at moderate temperatures, suitably at a range of 35–60° C. and is completed in 6 to 24 hours.

Much more vigorous reaction conditions are required where the triene triacylate is desired. This invention is further described in the examples which follow and are to be considered illustrative only and not as limiting it in spirit or in scope.

The present application is a continuation-in-part of the copending application Serial No. 707,471, filed January 7, 1958, now abandoned.

Example 1

A suspension of 10 g. of 6α-methyl-17α-hydroxyprogesterone in 150 ml. of acetic anhydride is agitated at 40° C. with 1.5 g. of p-toluenesulfonic acid monohydrate for 10 hours. Then 200 ml. of water are added slowly under efficient ice-cooling and the mixture is agitated until the excess anhydride has been destroyed. The crude crystalline precipitate is collected on a filter, washed to neutrality with water, and then with a small amount of methanol. This crude material consists of a mixture of 3,17α-diacetoxy-6-methyl-3,5-pregnadien-20-one and 3,17α,20-triacetoxy-6-methyl-3,5,20-pregnatriene.

Recrystallization from a 1:1 mixture of dichloromethane and methanol yields, 3,17α-diacetoxy-6-methyl-3,5-pregnadien-20-one melting at about 160–163° C. The specific rotation of a chloroform solution is —158°. The molecular extinction coefficient of an ultraviolet maximum at 244 millimicrons is about 19,000.

While the initial reaction mixture shows a strong band in the infrared region of 6.0 microns, indicative of a 20, 21-double bond, the diene did not show any absorption in that region. The diene compound has the structural formula

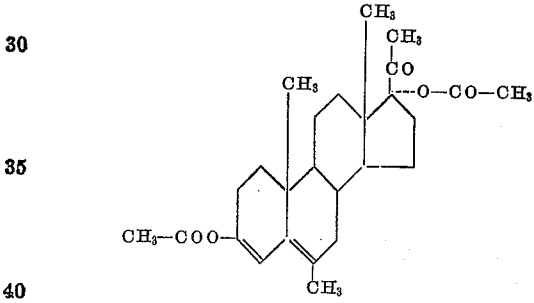

Example 2

A suspension of 10 g. of 6α-methyl-17α-acetoxyprogesterone in 150 ml. of acetic anhydride is agitated at 40° C. with 2 g. of p-toluenesulfonic acid monohydrate for a period of 16 hours. 200 g. of water are then added slowly under good ice cooling and the workup is continued as in the preceding example to yield 3,17α-diacetoxy-6-methyl-3,5-pregnadien-20-one which has the same properties as that of the preceding example. As in the preceding example, the initial mixture contains also 3,17α,20-triacetoxy-6-methyl-3,5,20-pregnatriene.

Example 3

A suspension of 11 g. of 5α,17α-dihydroxy-6β-methyl-allopregnane-3,20-dione in 150 ml. of acetic anhydride is agitated at 40° C. with 1.5 g. of p-toluenesulfonic acid monohydrate for a period of 16 hours. The reaction mixture is then worked up as in Example 1 to yield a mixture of 3,17α-diacetoxy-6-methyl-3,5-pregnadien-20-one and 3,17α,20-triacetoxy-6-methyl-3,5,20-pregnatriene.

Example 4

A reaction flask equipped with a distillation column having a total reflux take-off head is charged with 10 g. of 6α-methyl-17α-hydroxyprogesterone, 250 ml. of isopropenyl acetate, 500 mg. of p-toluenesulfonic acid monohydrate and 10 ml. of acetic anhydride. This mixture is heated to distillation temperature and a very high reflux ratio is maintained by taking off only one drop of condensate per minute. The progress of the very slow reaction can be followed by the vapor temperature at the top of the column which, during the first hours, remains at the level of the boiling point of acetone. The end point of the reaction can be exactly determined by refractive index readings and volumetric measurements of the distillate, consisting of a mixture of acetone and isopropenyl acetate. After 56 hours of heating at this rate 3 mol parts of acetone are present in the distillate per mol part of steroid treated. The endpoint is also indicated by a gradual increase in the distillation temperature which, at the end of 45 hours, should reach that of the boiling point of isopropenyl acetate.

After cooling, 1 g. of sodium bicarbonate is added and the mixture is evaporated under vacuum at about 25° C. The residue is extracted with 2 l. of hexane and washed repeatedly with water. The washed extract is decolorized with charcoal and the filtrate is concentrated under vacuum to dryness at 25° C. Trituration of the residue with a small amount of methanol yields yellowish crystals. These are recrystallized by dissolving in methanol without heating and concentration under vacuum. The 3,17α,20 - triacetoxy - 6 - methyl - 3,5,20 - pregnatriene, thus obtained melts at about 110–115° C. with decomposition. The specific rotation of a chloroform solution is −190°. An ultraviolet maximum at about 243.5 millimicrons has a molecular extinction coefficient of 19,500. The infrared adsorption spectrum shows a strong band at about 5.98 microns.

The compound has the structural formula

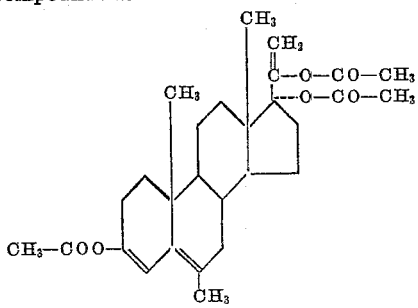

The same compound can also be prepared by substituting as a starting material 6α-methyl-17α-acetoxyprogesterone.

Substituting for the 6α-methyl-17α-hydroxyprogesterone as a starting material 11 g. of 5α,17α-dihydroxy-6β-ethylallopregnane-3,20-dione and workup as hereinabove yields the 3,17α,20-triacetoxy-6-ethyl-3,5,20-pregnatriene which shows a specific rotation in a chloroform solution of about −210°. Infrared maxima are observed at about 5.7, 5.75, 6.0, 6.2, 7.2, 7.3, 8.2, 8.25, 11.2 and 11.53 microns.

*Example 5*

A suspension of 2 g. of 6α-methyl-17α-hydroxyprogesterone in 30 ml. of propionic anhydride is stirred at 40° C. with 0.3 g. of p-toluenesulfonic acid monohydrate for 20 hours. Then 40 ml. of water are slowly added under efficient ice-cooling and the mixture is stirred until the excess anhydride has been destroyed. The crude crystalline precipitate is collected on a filter, washed to neutrality with water and then washed with a small amount of methanol. There is thus obtained a mixture of 3,17-dipropionoxy-6-methyl-3,5-pregnadien-20-one and a smaller quantity of 3,17,20-tripropionoxy-6-methyl-3,5,20-pregnatriene. Recrystallization from a 50% solution of dichloromethane in methanol yields the pure 3,17-dipropionoxy-6-methyl-3,5-pregnadien-20-one. An ultraviolet maximum is observed at 244 millimicrons with an extinction coefficient of about 18,500. Infrared maxima are observed at 5.7, 5.75, 5.82, 6.06, 7.19, 7.28, 8.0, 8.22, 8.24, 10.24 and 11.53 microns.

*Example 6*

To a solution of 185 g. of 3,20-bisethylenedioxy-5α,6α-epoxy-21-acetoxyallopregnan-17α-ol in 2 l. of anhydrous tetrahydrofuran are added slowly 1650 ml. of 3 N ethylmagnesium bromide in ether. The mixture is refluxed for 37 hours. There are added successively under ice-cooling 500 ml. of water and then one liter of 1:1 hydrochloric acid. The mixture is agitated until all the solids have entered into solution. The organic layer is then separated and washed with water. The aqueous solutions are re-extracted with ether. The ether solutions are concentrated to dryness under vacuum. Then a mixture of 800 ml. of glacial acetic acid in 200 ml. of water is added to the residue and the mixture is heated under vigorous agitation. After 10 minutes of refluxing, the mixture is cooled and the precipitate is collected on a filter and washed with methanol to yield 5α,17α-dihydroxy-6β-ethylallopregnane-3,20-dione. A suspension of 10 g. of 5α,17α - dihydroxy - 6β - ethylallopregnane - 3,20 - dione thus obtained in 150 ml. of acetic anhydride is agitated at 40° C. with 1.5 g. of p-toluenesulfonic acid monohydrate for 12 hours, chilled and treated slowly with 200 ml. of ice water. The mixture is stirred until the excess anhydride has been destroyed. The crude crystalline precipitate is collected on a filter and washed with water to neutrality and finally with methanol to yield a mixture of 3,17α-diacetoxy-6-ethyl-3,5-pregnadien-20-one and 3,17α,20-triacetoxy-6-ethyl-3,5,20-pregnatriene. Recrystallization from a 1:1 mixture of dichloromethane and methanol yields the 3,17α-diacetoxy-6-ethyl-3,5-pregnadien-20-one. The specified rotation of the chloroform solution is 161°. The molecular extinction coefficient of an ultraviolet maximum at 244 millimicrons is about 18,700. Infrared maxima are observed at about 5.7, 5.75, 5.82, 6.0, 6.2, 7.2, 7.28, 7.92, 8.23, 10.25 and 11.5 microns.

*Example 7*

A suspension of 10 g. of 6α-methyl-17α-acetoxyprogesterone in 150 ml. of propionic anhydride is agitated at 40° C. with 1.5 g. of p-toluenesulfonic acid monohydrate for 12 hours. The mixture is then chilled and carefully treated with 200 g. of ice water and stirred until all of the anhydride has been destroyed. The crude crystalline precipitate is collected on a filter and washed with water to neutrality and then with a small amount of methanol to yield a mixture of 3-propionoxy-17α-acetoxy-6-methyl-3,5-pregnadien-20-one and a small amount of 17α-acetoxy-3,20-dipropionoxy-6 - methyl - 3,5,20 - pregnatriene. This mixture is recrystallized from a 50% solution of dichloromethane in methanol to yield 3-propionoxy-17α-acetoxy-6-methyl-3,5-pregnadien-20-one. The molecular extinction coefficient of an ultraviolet maximum at 244 millimicrons is about 18,000. Infrared maxima are observed at 5.7, 5.75, 5.82, 6.0, 6.2, 7.2, 7.28, 7.92, 8.00, 8.22, 8.24, 10.24 and 11.53 microns.

*Example 8*

A mixture of 1 g. of 6α-methyl-17α-hydroxyprogesterone, 25 ml. of isopropenyl acetate, 50 mg. of p-toluenesulfonic acid monohydrate and 1 ml. of propionic anhydride is submitted to the procedure of Example 4 and there is thus obtained 3,17α,20-tripropionoxy-6-methyl-3,5,20-pregnatriene. The compound melts unsharply with decomposition.

An ultraviolet maximum at 243.5 millimicrons shows an extinction coefficient of about 19,300. Infrared maxima are observed at about 5.7, 5.75, 5.98, 6.2, 7.22, 7.30, 9.2, 8.24, 8.26, 11.2 and 11.53 microns.

What is claimed is:

1. A compound of the structural formula

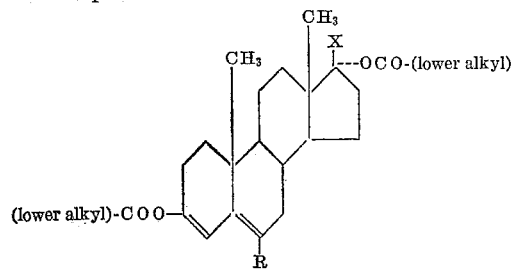

wherein X is a member of the class consisting of —CO—CH₃ and —C(OCO-lower alkyl)=CH₂ and wherein R is a lower alkyl radical of less than three carbon atoms.

2. A compound of the structural formula

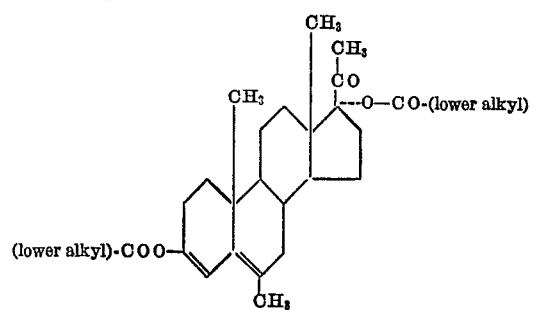

3. 3,17α-diacetoxy-6-methyl-3,5-pregnadien-20-one.

4. A compound of the structural formula

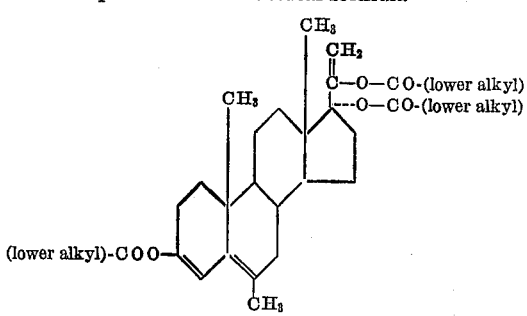

5. 3,17α,20-triacetoxy-6-methyl-3,5,20-pregnatriene.

References Cited in the file of this patent
UNITED STATES PATENTS 2,365,292    Ruzicka et al. _____ Dec. 19, 1944
2,753,360    Kaspar et al. _____ July 3, 1956